United States Patent
Bricot et al.

[11] 3,837,725
[45] Sept. 24, 1974

[54] SYSTEMS FOR CONSTRUCTING SMALL FRESNEL HOLOGRAMS

[75] Inventors: Claude Bricot; Jean Pierre Le Mérer; Claude Puech, all of Paris, France

[73] Assignee: Thomson-CSF, Paris, France

[22] Filed: June 16, 1972

[21] Appl. No.: 263,616

[30] Foreign Application Priority Data
June 29, 1971   France .............................. 71.23621

[52] U.S. Cl. ................................................. 350/3.5
[51] Int. Cl. ........................................... G02b 27/00
[58] Field of Search . 350/3.5; 340/173 LM, 173 LT

[56] References Cited
UNITED STATES PATENTS
3,405,614   10/1968   Lin et al. ............................ 350/3.5
3,650,595   3/1972    Gerritsen et al. .................... 350/3.5
3,677,616   7/1972    Lewis .................................. 350/3.5

OTHER PUBLICATIONS
Buzzard, "High Speed Photography–Proc. of the 8th International Congress," June 1968, Stockholm, pp. 335–340

Gerritsen et al., Applied Optics, Vol. 7, No. 11, Nov. 1968, pp. 2301–2311

Primary Examiner—Ronald J. Stern
Attorney, Agent, or Firm—Cushman, Darby & Cushman

[57] ABSTRACT

The present invention relates to the construction of Fresnel holograms having an area smaller than the area of the non-uniform transparency object utilised to construct them.

The invention relates to a construction system wherein the illumination of the object is effected through the medium of an optical concentrating system converting a parallel beam, into a set of elementary parallel beams intersecting in the exposure window.

The invention can be applied to the high-density storage of optical data.

11 Claims, 7 Drawing Figures

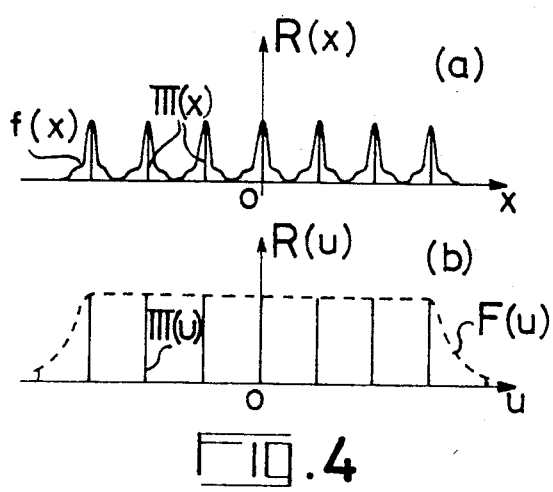
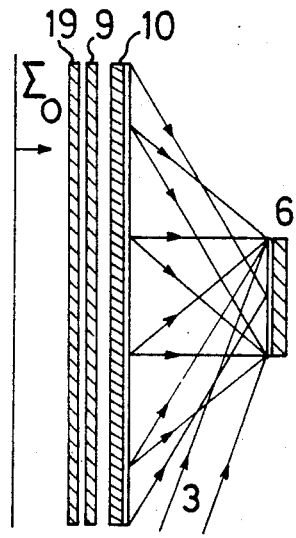
Fig. 4
Fig. 5
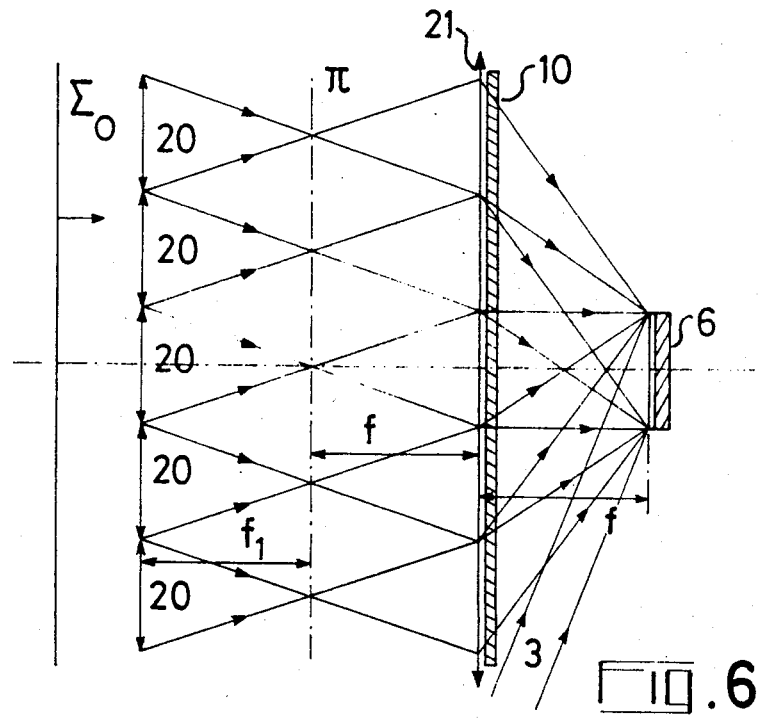
Fig. 6

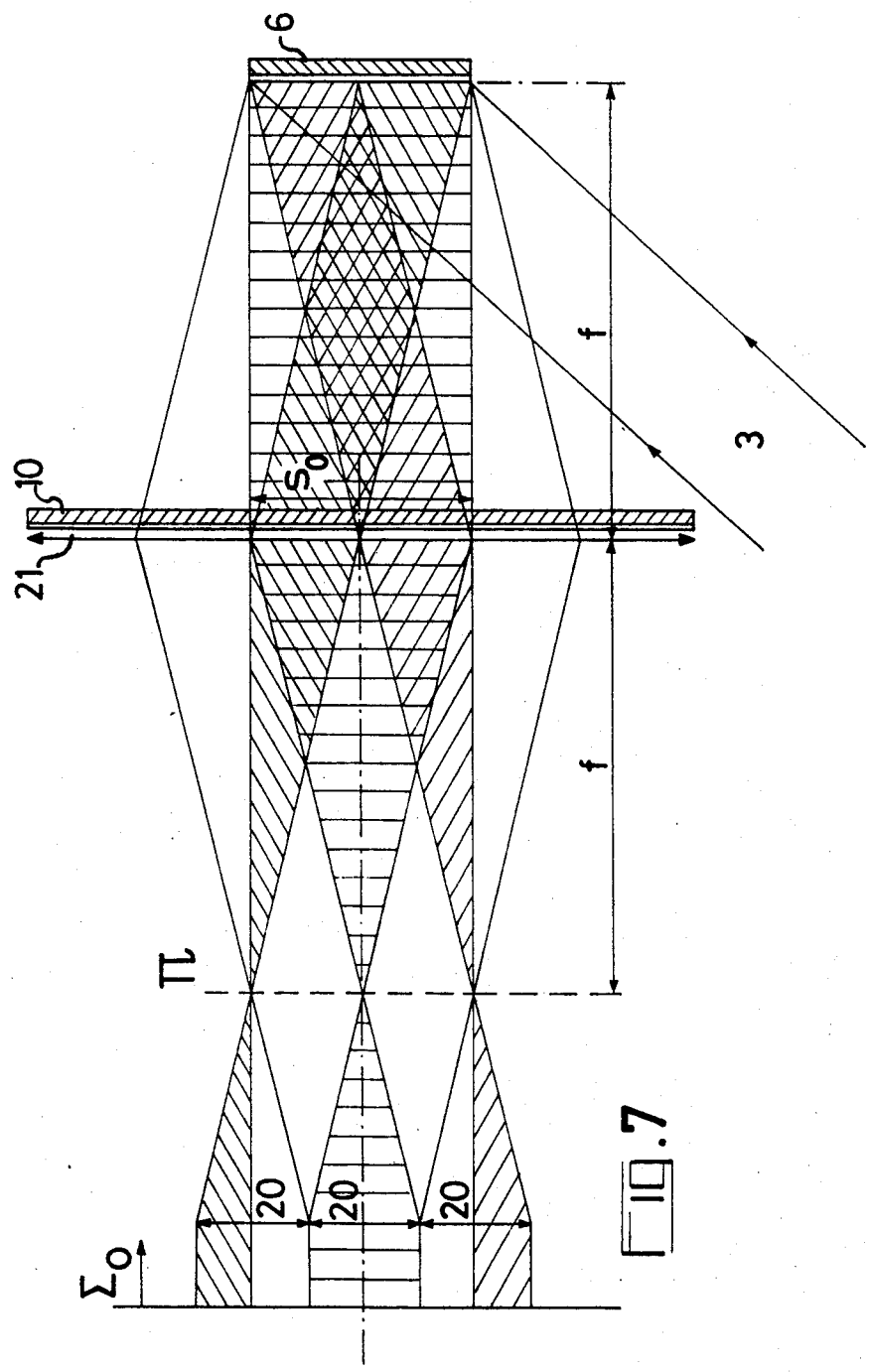

SYSTEMS FOR CONSTRUCTING SMALL FRESNEL HOLOGRAMS

The present invention relates to systems for constructing the Fresnel hologram of an object, constituted by a non-uniform transparency data-carrier.

The storage of information in the form of holograms has the advantage that it considerably reduces the dimensions of the data-carrier on which the information is transcribed. However, holograms are read out with coherent radiation giving rise, in the reconstructed image, to speckle which can disturb the imaged optical data.

The speckle is the result of random fluctuations in light intensity, which are the more marked the smaller the extent of the hologram in relation to the reconstructed image. The result is that in many cases the limitation is imposed more by this speckle than by the resolving power which is determined in accordance with the laws of diffraction.

Although speckle is inevitably present in all observations made using coherent light, it is evident that the conventional construction process of holograms is the factor which is chiefly responsible for the formation of speckle. This objectionable effect is particularly disturbing when conventional holography is applied to the construction of very small holograms.

The object of the invention is to reduce the trouble caused by the speckle. This is achieved by means of a Fresnel hologram construction system in which the object plate carrying the data for transcription, transmits, through the provision of a concentrating optical system, a set of separate light beams which encounter the reference beam in an exposure window whose area, which is substantially smaller than that of the object plate, corresponds to the size of the hologram being constructed.

According to the present invention, there is provided an optical system for constructing Fresnel holograms, comprising a source of coherent radiation emitting a parallel object beam and a reference beam; an object window for positioning said object in the path of said parallel object beam; and an exposure window arranged for receiving a radiation detector, and positioned for receiving the radiant energy contained in said reference beam and a fraction of the radiant energy emerging from said object window; said system further comprising: optical concentrating means arranged between said source of coherent radiation and said object window for converting said parallel object beam into a set of parallel elementary beams intersecting one another in said exposure window; said object window having an area larger than the area of said exposure window, and being fully illuminated by said set of parallel elementary beams.

For a better understanding of the invention and to show how the same may be carried into effect, reference will be made to the ensuing description and the attached figures in which:

FIG. 4 is an explanatory diagram;

FIG. 5 illustrates a first embodiment of optical concentrating means for the system shown in FIG. 3;

FIG. 6 illustrates a second variant embodiment of optical concentrating means for the system of FIG. 3;

FIG. 7 illustrates a third variant embodiment of optical concentrating means for the system of FIG. 3;

Figure 1:
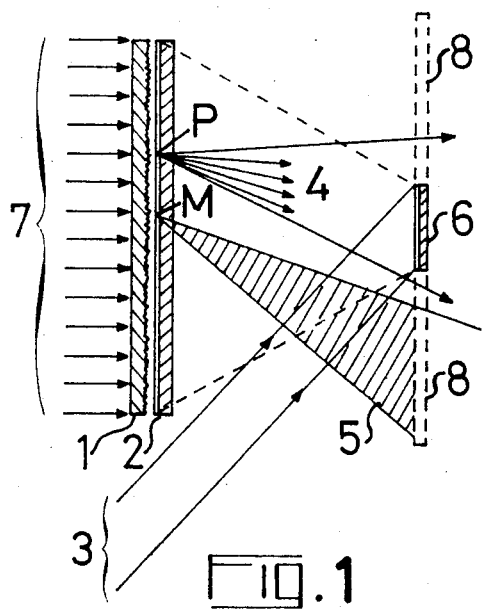
FIGS. 1 and 2 are explanatory diagrams.

FIG. 1 illustrates the usual process employed in the construction of a Fresnel hologram. The object used to construct the hologram is in the present case a support 2 of non-uniform transparency, which carries the optical data to be transcribed. Transcription of the data in holographic form is effected by means of coherent light falling onto an unexposed photographic emulsion 6. To this end, the support 2 is illuminated by an object beam 7 in order to diffract in the direction of the emulsion 6 a modulated luminous beam which interferes with a parallel reference beam 3 also directed onto the emulsion. A latent image made up of a pattern of interference fringes in formed in the body of the emulsion 6 and, after development, a Fresnel hologram is obtained. This hologram constitutes an optical data-carrier capable of reconstructing the image of the data stored in the support 2 provided that it is illuminated by a read-out beam identical to the reference beam 3.

This entire conventional recording process is completely satisfactory as long as the surface of the emulsion 6 is as large as that of the support 2; however, as FIG. 1 shows, frequently the hologram has to have a size substantially smaller than that of the support 2. Assuming that the object beam 7 is a parallel beam and that no arrangement is provided to diffuse the light emerging from the carrier, only the central zone of the support 2 will be effectively recorded in the hologram. It is a known procedure to arrange before the support 2, a ground glass 1; the diffusing effect thus obtained, coupled with that which the support 2 itself may exhibit, makes it possible to effect holographic recording of the whole of the object surface. However, the diffusion is a non-uniform mechanism. It is observed that certain points P on the support 2 produce diffuse radiation 4 which effectively illuminates the emulsion 6, whilst other points such as those M produce a diffused radiation 5 contained in a solid angle which passes to one side of the emulsion 6. These anomalies in the diffusion mechanism mean that the hologram 6 can only reconstruct the points P, whilst the points P are absent from the image reconstructed from the hologram. This irregularity in diffusion is thus the chief cause of the unwanted speckle which impair the quality of the reconstructed images.

In order to palliate this defect, the sensitive area 6 can be enlarged in the form of extensions 8 which pick up the light diffused by the points M and P of the support, however, this solution is in conflict with the aim of obtaining the highest possible optical data storage density.

In order to produce small-sized holograms capable of reconstructing images in which speckle does not constitute a major problem, it is essential to effect proper transmission of light between the surface of the object and that of the hologram. It is therefore necessary to dispense with the use of a ground glass screen since the latter does not satisfy this requirement. However, if it is desired to retain the properties of a Fresnel hologram, the solution is not simply to replace the ground glass screen by an ordinary convergent lens. Optical concentrating systems in accordance with the invention are analysed in the following part of the description, but in order to more readily appreciate the principle of operation of a hologram constructing system in accordance with the invention, we must consider FIG. 2.

Figure 2:
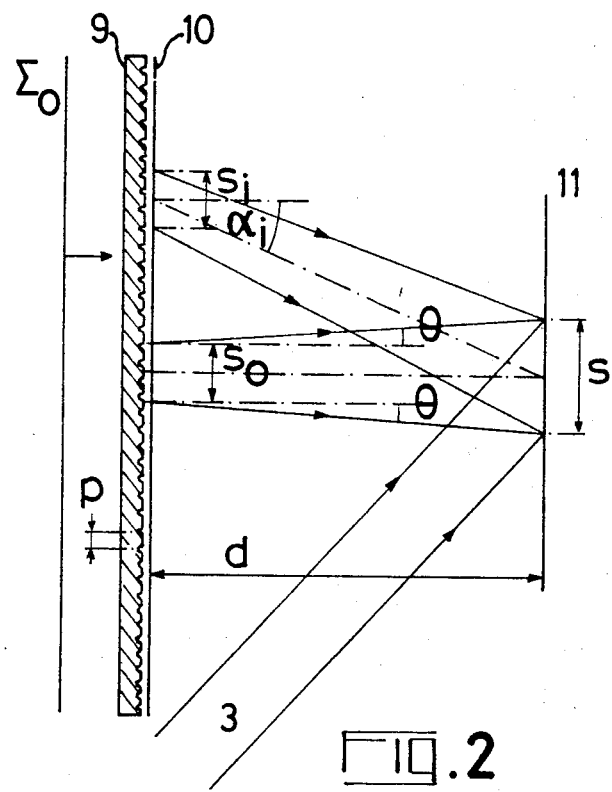

In this FIGURE, a transparency 10, seen edge-on, has been shown and this acts as the optical data-carrier object; an unexposed photographic emulsion 11 is located opposite the transparency 10 and receives, in a zone of width s, a reference light beam 3; the transparency 10 is illuminated by a plane light wave $\Sigma_o$ coming from a coherent light source which has not been shown in FIG. 2. Considering the zone of width $s$ within which the hologram is formed, it will be seen that without the help of an optical concentrating system, in effect only a zone of width $s_o$ of the object 10, can be recorded. The widths $s$ and $s_o$ of the aforementioned zones are linked by the relationship:

$$s = s_o + 2\lambda + \cdot d/p_o$$

where $p_o$ is the minimum interval between the data elements which are to occur in the image stored in the object 10; $\lambda$ is the wavelength of the light wave; and $d$ is the distance separating the object 10 from the emulsion 11.

This expression takes into account the fact that the radiation picked up by the hologram must contain in addition to the zero diffraction order the orders $-1$ and $+1$ in respect of which the diffraction angle $\theta$ has an upper limit of $\lambda/p_o$.

In order for the recording of the object 10 to be complete, the invention provides before the object 10 a diffraction grating 9. The pitch $p$ of this diffracting grating is selected in such a manner that the zone of width $s$ receives light from the whole of the surface of the object 10. If we imagine the surface of the object 10 to be broken down into adjacent zones of width $s_o$, a zone such as $s_i$ occupying the $i^{th}$ position from the zone $s_o$ should receive through the grating 9 a diffracted light beam corresponding to the $i^{th}$ diffraction order; thus, the diffracted beam must illuminate the zone $s$ of the emulsion 11. In addition, the pitch P of the grating 9 should be less than the resolution $p_o$ in order that the field of the grating 9 does not substantially alter the optical data recorded on the object 10. Since we know that the diffraction angle $\alpha_i$ of the grating is determined by the relationship $\sin \alpha_i = i \cdot \lambda/p$, where $i$ represents the diffraction order, it will be seen that the angle $\alpha_i$ of the light beam of order 1, is substantially equal to $\lambda/p$. Since the zone $s_1$ should be adjacent to the zone $s_o$ on the object 10, it can be seen from a consideration of FIG. 2 that $\alpha_1$ is substantially equal to $s \cdot \theta \cdot d/d$. These latter two relationships fix the pitch of the grating 9 which should be substantially equal to $p = p_0 \lambda \cdot d/p_0 s - \lambda \cdot d$ and, since $p$ should be less than $p_o$, we obtain the condition : $2 \lambda d < p_o \cdot s$.

By way of a non-limitative example, utilising the red spectrum line of a helium-neon laser ($\alpha = 0.63$ microns) and setting the resolution $p_o$ at 10 microns, it will be seen that the ratio $s/d$ should be at least equal to 0.126. If the width $s$ of the hologram is equal to 1 mm, the object 10 can be arranged at an interval of $d = 6$ mm. Under these conditions, the pitch of the grating 9 can be made equal to $p = 6$ microns.

Figure 3:
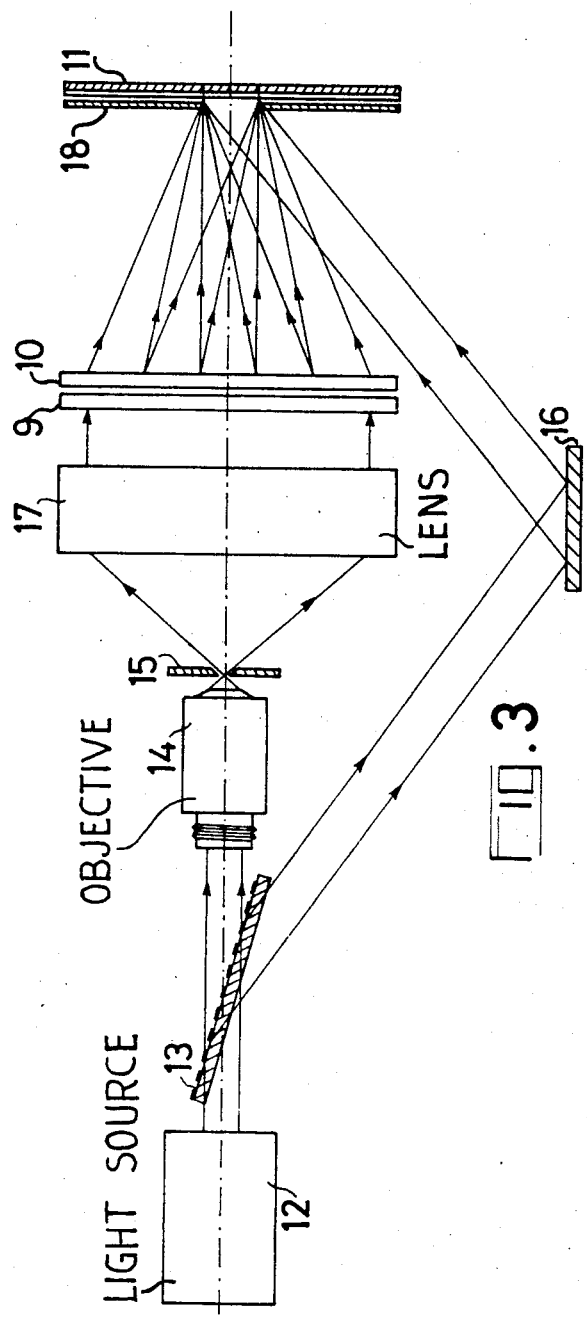
FIG. 3 illustrates an optical system for hologram construction, in accordance with the invention.

In FIG. 3, a hologram construction system in accordance with the invention can be seen. It comprises a coherent light source 12 emitting a parallel light beam split by the semi-transparent plate 13 into an object beam received by a lens 14, and a reference beam reflected by a mirror 16. The objective lens 14 cooperates with a lens 17 to produce an afocal beam-expanding system ; a diaphragm 15 located at the common focus of the lenses 14 and 17 stops out the parasitic rays which are due to imperfections in the lens 14. The wide-section object beam emerging from the lens 17 illuminates the transparency 10 carrying the optical data for recording. The transparency 10 is arranged in an object window which has not been shown. A diffraction grating 9 arranged between the lens 17 and the transparency 10 converts the expanded object beam into a set of parallel light beams which intersect one another in the exposure window of a mask 18; the reference beam reflected by the mirror 16 also passes through the window in the mask 18. Behind the mask 18 the unexposed photographic emulsion 11 is placed, upon which the hologram of the object 10 is to be recorded.

In FIG. 3, arrowed lines eave been used to indicate the path of the light rays; the rays issuing from the object 10 delimit parallel beams concentrated on the exposure window. As explained in relation to FIG. 2, the five beams illustrated in FIG. 3 correspond to the diffraction orders 0, +1, −1, +2 and −2 of the grating 9. The grating 9 constitutes an optical concentrating system which advantageously replaces a ground glass screen, because this system guarantees that no zone of the surface of the object 10 escapes holographic recording.

The design of the grating 9 can readily be carried out by calculating its pitch $p$ in accordance with the aforesaid formula.

As far as the profile to be given to the parallel grooves constituting the grating 9, is concerned, it should be so arranged that the quantities of light energy contained in the different diffracted beams have substantially equal values. In FIG. 4, at ($a$) a diagram has been used to illustrate a grating profile whose law of variation R($x$) is the convolution product of a function $f(x)$ defining the profile of a peak, and of a comb function $^M(x)$ representative of the periodic arrangement of the grooves. At ($b$) in FIG. 4, another diagram has been used to illustrate the angular distribution of the energy diffracted by the grating R($x$); u is a variable proportional to the diffraction angle $\theta$ and R ($u$) represents the diffracted light energy. The function R($u$) is this time simply the product of an envelope function F($u$) and a comb function $^M(u)$. In FIG. 4, a constant-level envelope function has been chosen for the seven spectrum lines illustrated at ($b$); this leads to a uniform distribution of diffracted energy between the diffraction orders 0, $\mp 1$, $\pm 2$ and $\pm 3$ of the grating whose peaks have the profile $f(x)$. It is thus possible to calculate the function $f(x)$ which defines the profile, knowing the function F($u$) and applying the normal Fourier transform rules.

In the foregoing, it has been implicitly assumed that the diffraction grating concentrates the light in the plane of the FIGS. 2 and 3; accordingly, the parallel grooves of the grating are disposed perpendicularly to the plane of the figure.

In FIG. 5, a first variant embodiment of the optical concentrating device in accordance with the invention has been shown.

The elements marked $\Sigma_o$, 9, 10 and 3 are the same as those similarly marked in FIG. 3; the element 6 is that portion of the unexposed emulsion 11, which is located in the exposure window and the element 19 represents a supplementary diffraction grating similar to that 9 but whose grooves are disposed perpendicularly to those of the grating 9. Thanks to the simultaneous use of two intersecting gratings 9 and 19, the light is concentrated simultaneously in the plane of the FIG. 5 and in a plane perpendicular to the trace of the wavefront $\Sigma_o$.

Again, use can be made of more than two gratings by choosing several different orientations of the grooves; in this fashion, optical data redundancy in the hologram is obtained. It should be borne in mind that the engraving of the multiple gratings can be effected on both faces of each of the plates used to produce them. Also, in a manner known per se, a single grating can be produced comprising a uniform mosaic of diffractive points having properties similar to those of a stack of gratings with parallel grooves.

The utilisation of diffraction gratings as the optical concentrating device has the drawback that only a small fraction of the light energy available in the plane wave $\Sigma_o$ is transmitted to the exposure window. To overcome this drawback, the invention provides for the use of pseudo-afocal systems for the optical concentrating device, which systems are made up of conventional or holographic convergent lenses.

In FIG. 6, a second variant embodiment of an optical concentrating system in accordance with the invention can be seen. This system differs from that of FIG. 5 by the substitution of lenses for the gratings 19 and 9. A set of convergent mutually adjacent lenses 20 causes the light energy of the plane wave $\Sigma_o$ to converge into a plurality of foci located in a focal plane $\pi$; the focal length of the lenses 20 is $f_l$. A convergent lens 21 having the plane $\pi$ as focal plane, picks up the divergent light beams coming from the lenses 20 and projects onto the hologram 6, through the object 10, a set of parallel beams. The focal length of the lens 21 is equal to $f$ so that the hologram 6 has to be located at the interval $f$ from the lens 21. It will be observed from a consideration of FIG. 6 that the lenses 20 have substantially the same width as the hologram 6; these lenses can be constituted by a mosaic of convergent lenses cut or moulded from a refractive material; these lenses, depending upon the application, may be spherical lenses, cylindrical lenses or pairs of crossed cylindrical lenses. Also a mosaic of holographic lenses 20 can be produced upon a flat substrate, their fringe networks possible partially overlapping one another. It will be seen from FIG. 6 that each lens 20 defines with a portion of the lens 21, an optical system which maintains parallelism in the entry and exit light rays, hence the name "pseudo-afocal" optical system.

In FIG. 7, a third variant embodiment of an optical concentrating system can be seen. The diagram of FIG. 7 differs from that of FIG. 6 by the fact that the lenses 20 have a smaller width than the hologram 6 and consequently than the width $s_o$ hereinbefore defined. The result is that the zone of width $s_o$ on the object 10 receives three parallel cross-hatched beams which are directed onto the hologram 6; this technique introduces optical data redundancy in the holographic recording. It will be seen from FIG. 7 that the three lenses 20 participate more or less fully in illuminating the hologram 6 through the zone of width $S_o$.

The hologram constructing systems described hereinbefore eliminate the drawbacks encountered in the production of small-sized Fresnel holograms. These systems are therefore highly advantageous for the storage of information in a very small volume so that they are of significance in fields such as the audio-visual field and microfilm work.

In closing, it should be pointed out that the systems described do not require accurate positioning of the object and that they make for extreme simplicity of production in the case of gratings and for very high efficiency in the case of lenses.

What we claim is:

1. An optical system for constructing Fresnel holograms from an object of non-uniform transparency carrying optical data, said system comprising: a source of coherent radiation emitting a collimated object beam and a reference beam; an object window having an aperture for positioning said object in the path of said collimated object beam; and an exposure window having an aperture arranged for receiving a radiation detector, and positioned for receiving the radiant energy contained in said reference beam and a fraction of the radiant energy emerging from the aperture of said object window; said system further comprising: optical concentrating means arranged between said source of coherent radiation and the aperture of said object window for converting said collimated object beam into a set of collimated elementary beams intersecting one another in the aperture of said exposure window; the aperture of said object window having an area larger than the area of the aperture of said exposure window, and being fully illuminated by said set of collimated elementary beams; the wavefronts of said collimated elementary beams remaining substantially plane between said optical concentrating means and the aperture of said exposure window in the absence of said object.

2. An optical system as claimed in claim 1, wherein said optical concentrating means comprise at least one diffraction grating.

3. An optical system as claimed in claim 2, wherein the profile of the grooves in said grating is selected in order to uniformly distribute the radiant energy between said elementary beams.

4. An optical system as claimed in claim 2, wherein said grating is associated with a second similar diffraction grating; the grooves of said second grating being perpendicular to the grooves of said one grating.

5. An optical system as claimed in claim 1, wherein said optical concentrating means comprise more than two superimposed diffraction gratings.

6. An optical system as claimed in claim 1, wherein said optical concentrating means comprise: a set of adjacent lenses receiving said object beam and having a common focal plane, and a supplementary lens having one of its focal planes coincident with said focal plane; the aperture of said exposure windows being located in the other focal plane of said supplementary lens.

7. An optical system as claimed in claim 6, wherein said lenses are made of a refractive material.

8. An optical system as claimed in claim 6, wherein said lenses are holographic lenses.

9. An optical system as claimed in claim 6, wherein the lenses constituting said set have a total area substantially equal to the area of the aperture of said exposure window.

10. An optical system as claimed in claim 6, wherein the lenses constituting said set have an total area smaller than the area of the aperture of said exposure window.

11. An optical system as claimed in claim 6, wherein the lenses constituting said set are formed by the superimposition of two orthogonal networks of cylindrical lenses.

* * * * *